United States Patent [19]

Bloomberg et al.

[11] Patent Number: 5,740,285

[45] Date of Patent: Apr. 14, 1998

[54] IMAGE REDUCTION/ENLARGEMENT TECHNIQUE

[75] Inventors: Dan S. Bloomberg; Daniel Davies, both of Palo Alto, Calif.

[73] Assignee: Xerox Corporation, Stamford, Conn.

[21] Appl. No.: 10,825

[22] Filed: Jan. 29, 1993

Related U.S. Application Data

[63] Continuation of Ser. No. 449,627, Dec. 8, 1989, abandoned.

[51] Int. Cl.[6] .................. G06T 3/40; G06T 5/30
[52] U.S. Cl. ........................... 382/299; 382/308
[58] Field of Search ................ 382/47, 55, 44, 382/257, 299, 298, 308; 345/129, 127; 395/102, 139; 358/451, 528

[56] References Cited

U.S. PATENT DOCUMENTS

| | | | |
|---|---|---|---|
| 3,289,164 | 11/1966 | Rabinow | 382/47 |
| 3,560,930 | 2/1971 | Howard | 382/56 |
| 4,097,846 | 6/1978 | Lewis | 382/47 |
| 4,414,685 | 11/1983 | Sternberg | 382/49 |
| 4,447,882 | 5/1984 | Walz | 382/47 |
| 4,555,191 | 11/1985 | Gojo | 382/56 |
| 4,569,081 | 2/1986 | Mintzer et al. | 382/47 |
| 4,573,200 | 2/1986 | Bednar et al. | 382/298 |
| 4,601,055 | 7/1986 | Kent | 382/41 |
| 4,700,400 | 10/1987 | Ross | 382/47 |
| 4,712,140 | 12/1987 | Mintzer et al. | 382/47 |
| 4,742,553 | 5/1988 | Irwin | 382/47 |
| 4,742,558 | 5/1988 | Ishibashi et al. | 382/56 |
| 4,786,976 | 11/1988 | Takao et al. | 382/53 |
| 4,791,675 | 12/1988 | Deering et al. | 382/41 |
| 4,791,679 | 12/1988 | Barski et al. | 382/41 |
| 4,805,031 | 2/1989 | Powel | 358/463 |
| 4,817,186 | 3/1989 | Goolsbey et al. | 382/48 |
| 4,825,388 | 4/1989 | Dailey et al. | 382/47 |
| 4,827,330 | 5/1989 | Walsh et al. | 382/57 |
| 4,858,018 | 8/1989 | Tanaka | 358/464 |
| 4,948,955 | 8/1990 | Lee et al. | 235/462 |
| 5,048,109 | 9/1991 | Bloomberg et al. | 382/50 |
| 5,065,437 | 11/1991 | Bloomberg et al. | 382/55 |
| 5,131,053 | 7/1992 | Bernzott et al. | 382/229 |
| 5,161,213 | 11/1992 | Knowlton | 382/47 |
| 5,276,315 | 1/1994 | Surka | 235/462 |
| 5,335,299 | 8/1994 | Atkinson | 382/47 |

FOREIGN PATENT DOCUMENTS

| | | |
|---|---|---|
| 0 048 941 | 9/1981 | European Pat. Off. . |
| 0 308 673 | 8/1988 | European Pat. Off. . |
| 0 287 995 | 10/1988 | European Pat. Off. . |
| 0 288 266 | 10/1988 | European Pat. Off. . |
| 61-2259974 | 10/1986 | Japan . |
| 2 160 057 | 12/1985 | United Kingdom . |

OTHER PUBLICATIONS

Haralick et al. "The Digital Morphological Sampling Theorear." 1988 IEEE Int. Symp. on Circuits and Systems, vol. 3, pp. 2789–2793, Jun. 1988.

Haralick et al. "Binary Morphology: Working in the Sampled Domain," Proceedings CUPR '88, pp. 780–791, Jun. 1988.

(List continued on next page.)

*Primary Examiner*—Michael T. Razavi
*Assistant Examiner*—Jon Chang
*Attorney, Agent, or Firm*—Townsend and Townsend and Crew LLP

[57] ABSTRACT

In brief, a method of reducing an M X N input binary image (M rows of N pixels each) by a factor of m vertically and n horizontally includes the steps of performing at least one logical operation between bits in consecutive groups of m adjacent rows to provide a resultant single row for each group of m rows, and performing at least one logical operation between bits in consecutive groups of n adjacent columns to provide a resultant single column for each groups of n columns. For certain types of reductions, the resulting reduced image will be the desired output image, while for other types, the resultant image will be one of a required plurality of intermediate images, which are then combined to provide the desired output image.

44 Claims, 16 Drawing Sheets

OTHER PUBLICATIONS

'Mano' Computer System Architecture, Prentice Hall Inc ©1982 pp. 8–14.

Gothmann "Digital Electronics, Intro to Theory & Practice" Prentice Hall Inc ©1977 pp. 297–301.

Week 8319, Derwent Publications Ltd., London, GB AN 83–G3247K (abstract).

Research Disclosure, 228(007):142–143, 10 Apr. 1983, "Two–Tone Picture Reduction Method–Uses Array of Digitally Valued Elements, with Number of Dark Areas Proportional to Square of Reducing Factor".

M. Morris Mano, "Computer System Architecture," Prentice–Hall, Inc., ©1982, pp. 8–14.

K.Y. Wong et al., "Document Analysis System," *IBM. J. Res. Development*, vol. 26, No. 6, Nov. 1982.

S.R. Sternberg, "Biomedical Image Processing," *IEEE*, Jan. 1983.

P. Maragos, "Tutorial on Advances in Morphological Image Processing and Analysis," *Optical Engineering*, vol. 26, No. 7, Jul. 1987.

R.M. Haralick et al., "Image Analysis Using Mathematical Morphology," *IEEE*, vol. PAM1–9, No. 4, Jul. 1987.

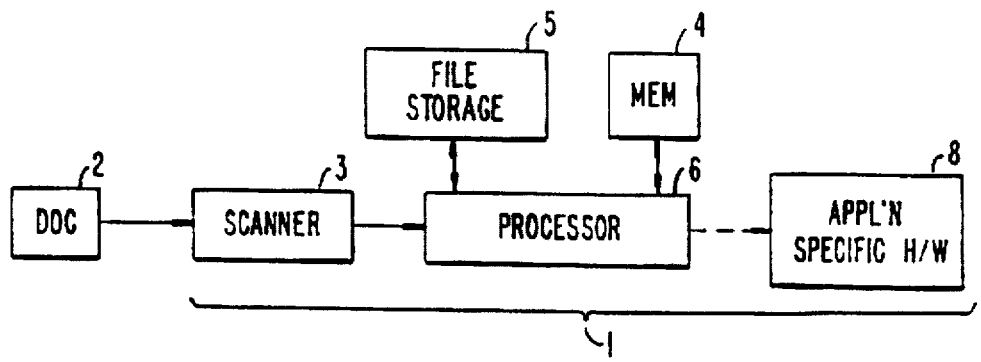
FIG._1.
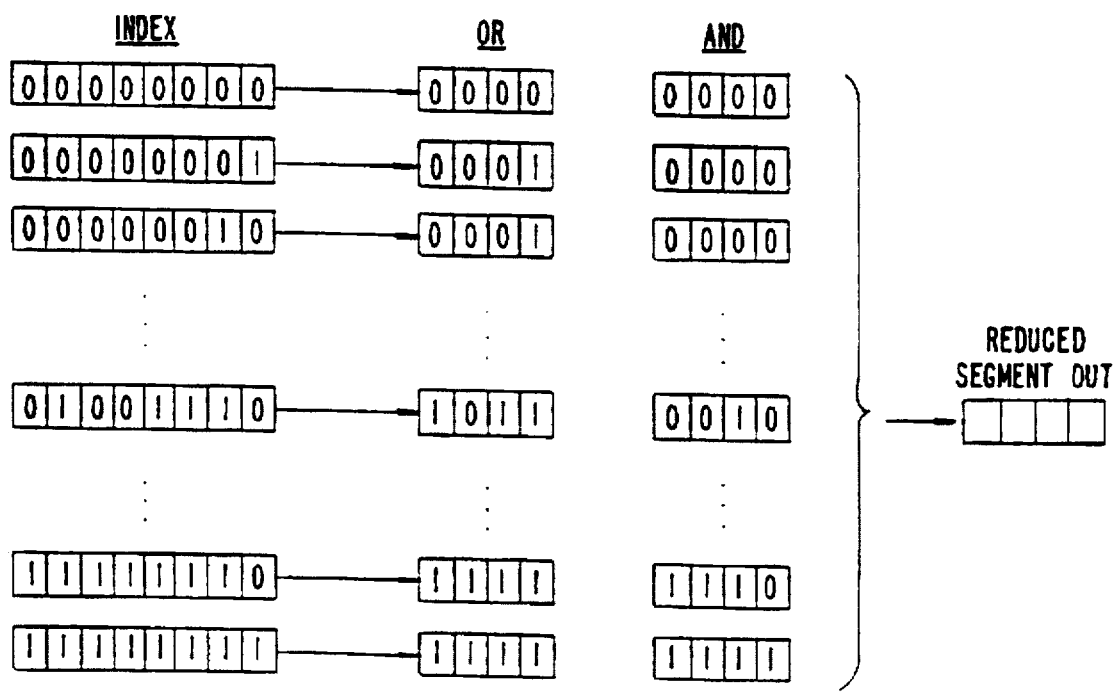
FIG._4.

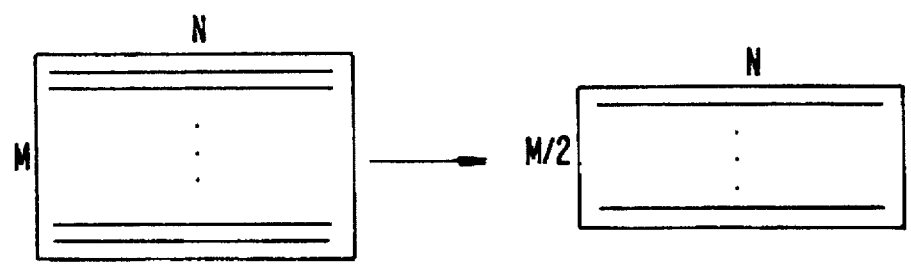
FIG._2A.
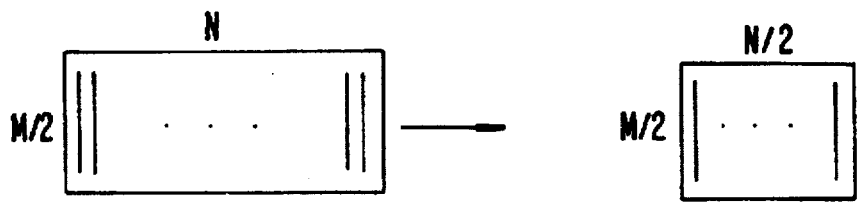
FIG._2B.
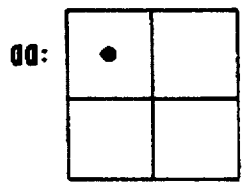
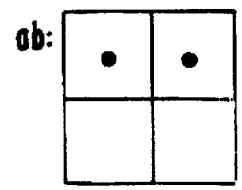
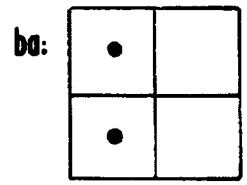
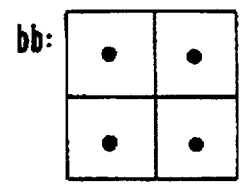
FIG._3A.
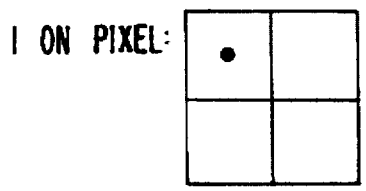
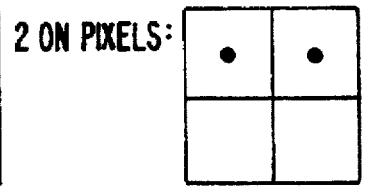
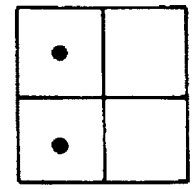
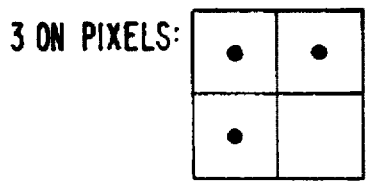
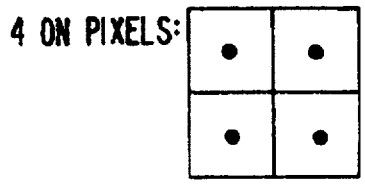
FIG._3B.

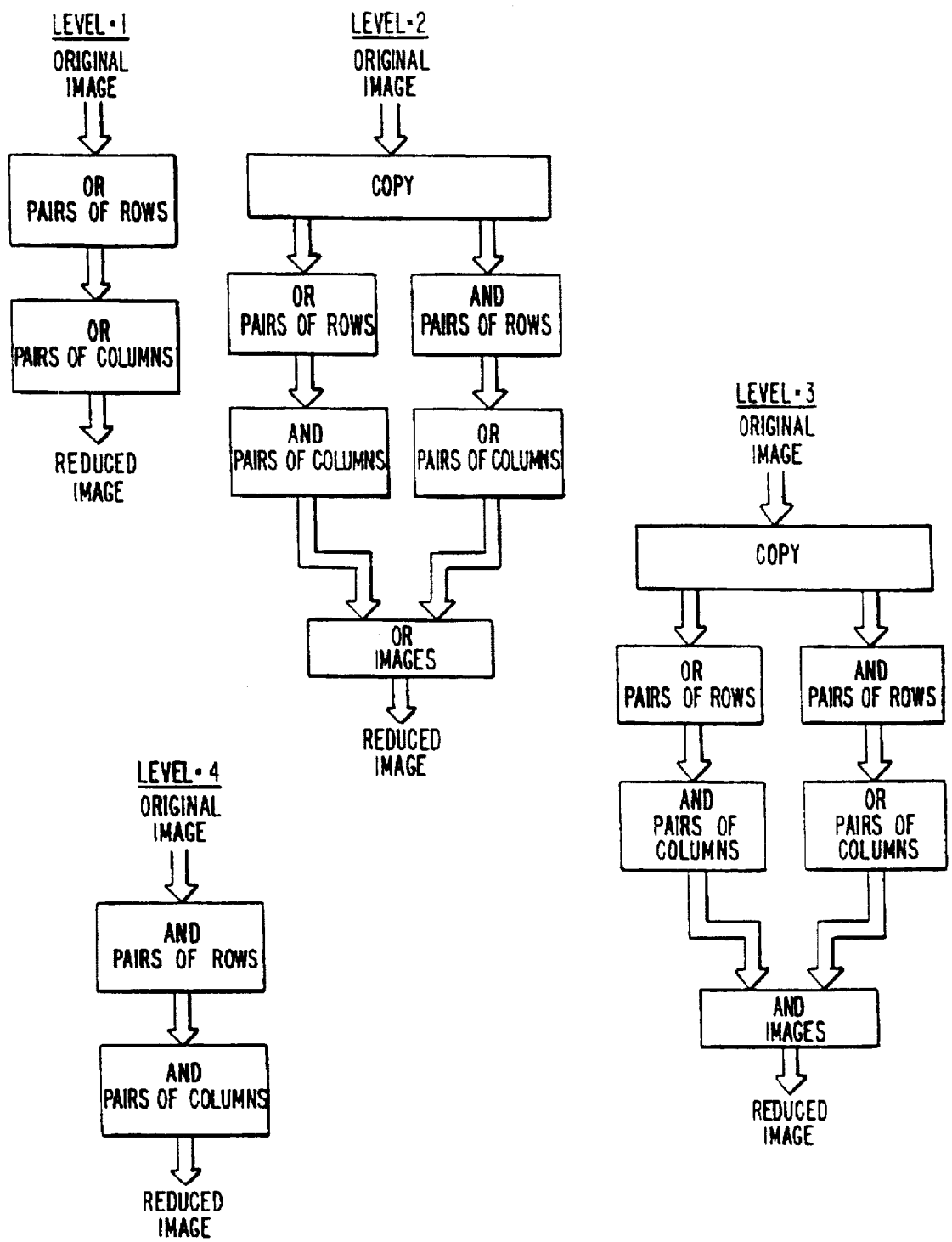
FIG._2C.

$III_1$ [1 (OR MORE) ON BITS]:
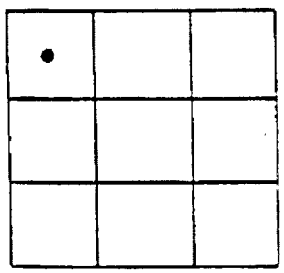
aa
$III_2$ [2 (OR MORE) ON BITS]:
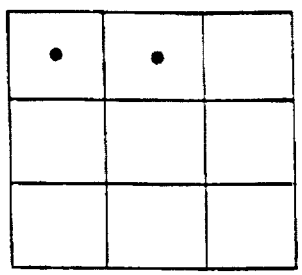
ab       ba
$III_3$ [3 (OR MORE) ON BITS]:
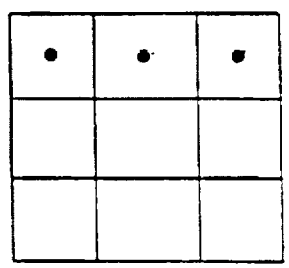 U 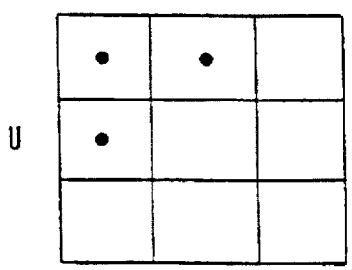 U 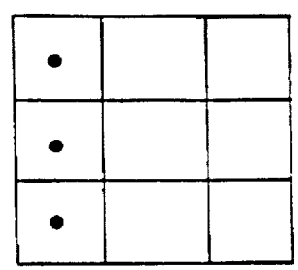
ac       ab ∩ ba       ca
$III_4$ [4 (OR MORE) ON BITS]:
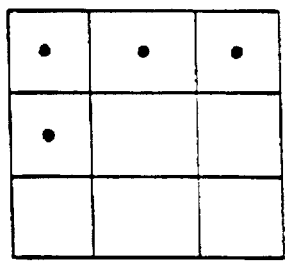 U 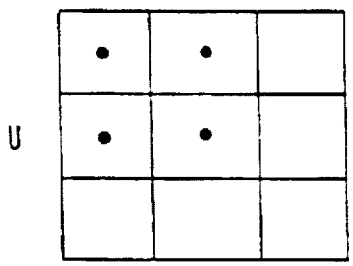 U 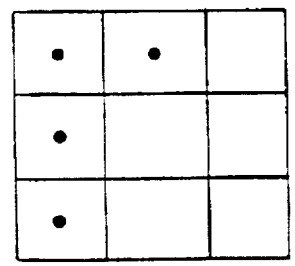
ac ∩ ba       bb       ab ∩ ca
FIG._5A.

III₅ [5 (OR MORE) ON BITS]:

ac ∩ bb    U    ac ∩ ca    U    bb ∩ ca

III₆ [6 (OR MORE) ON BITS]:

bc    U    ac ∩ bb ∩ ca    U    cb

III₇ [7 (OR MORE) ON BITS]:

bc ∩ ca    U    ac ∩ cb

III₈ [8 (OR MORE) ON BITS]:

bc ∩ cb

III₉ [9 (OR MORE) ON BITS]:

IV$_4$ [4 (OR MORE) ON BITS]:

ad                    U   III$_4$   U                    da

IV$_5$ [5 (OR MORE) ON BITS]:

ad ∩ ba               U   III$_5$   U                    ab ∩ da

IV$_6$ [6 (OR MORE) ON BITS]:

ad ∩ bb               U   III$_6$   U                    bb ∩ da

FIG._6A.

IV₇ [ 7 (OR MORE) ON BITS]:

od ∩ III₆   U   od ∩ da

U   III₇   U       III₆ ∩ da

FIG._6B.

$IV_8$ [8 (OR MORE) ON BITS]:

bd ∪ ∪ ad ∩ $III_7$

∪ $III_8$ ∪ ∪ $III_7$ ∩ da

$IV_9$ [9 (OR MORE) ON BITS]:

bd ∩ ca U ad ∩ $III_8$

U U ad ∩ $III_7$ ∩ da

U $III_9$ U $III_8$ ∩ da U ac ∩ db

FIG._6D.

IV₁₀ [10 (OR MORE) ON BITS]:

bd ∩ cb   U   bd ∩ da ad ∩ cc   U   ad ∩ III₈ ∩ da   U   ad ∩ db

$|V_{||}$ [11 (OR MORE) ON BITS]:

IV$_{12}$ [12 (OR MORE) ON BITS]:

IV$_{13}$ [13 (OR MORE) ON BITS]:

cd ∩ da   U   bd ∩ cc ∩ db   U   ad ∩ dc

IV$_{14}$ [14 (OR MORE) ON BITS]:

cd ∩ db   U   bd ∩ dc

IV$_{15}$ [15 (OR MORE) ON BITS]:

cd ∩ dc

IV$_{16}$ [16 (OR MORE) ON BITS]:

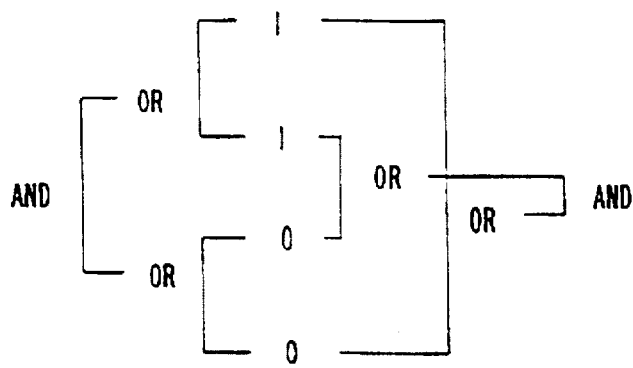
FIG._7.
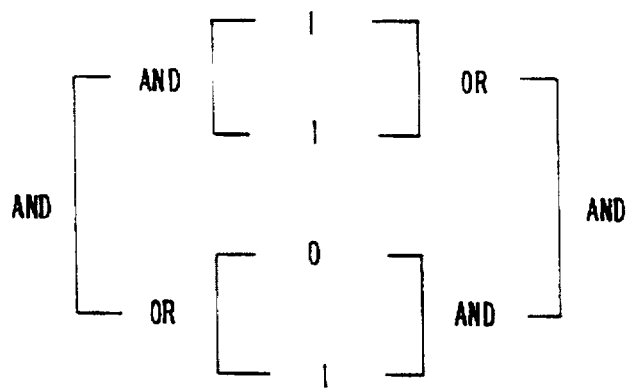
FIG._8.
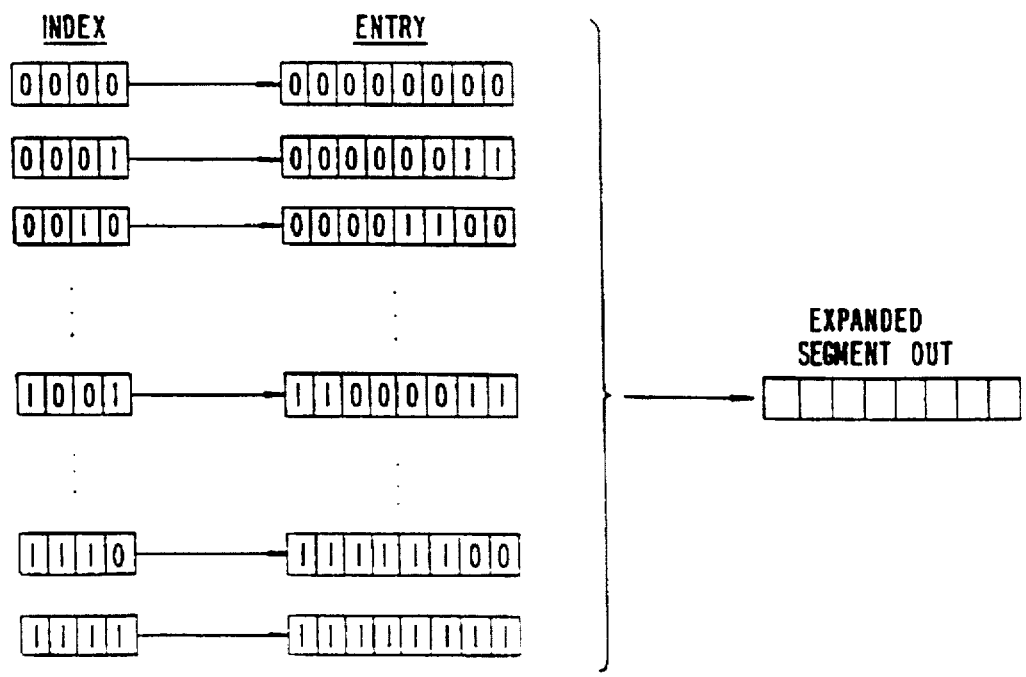
FIG._9.

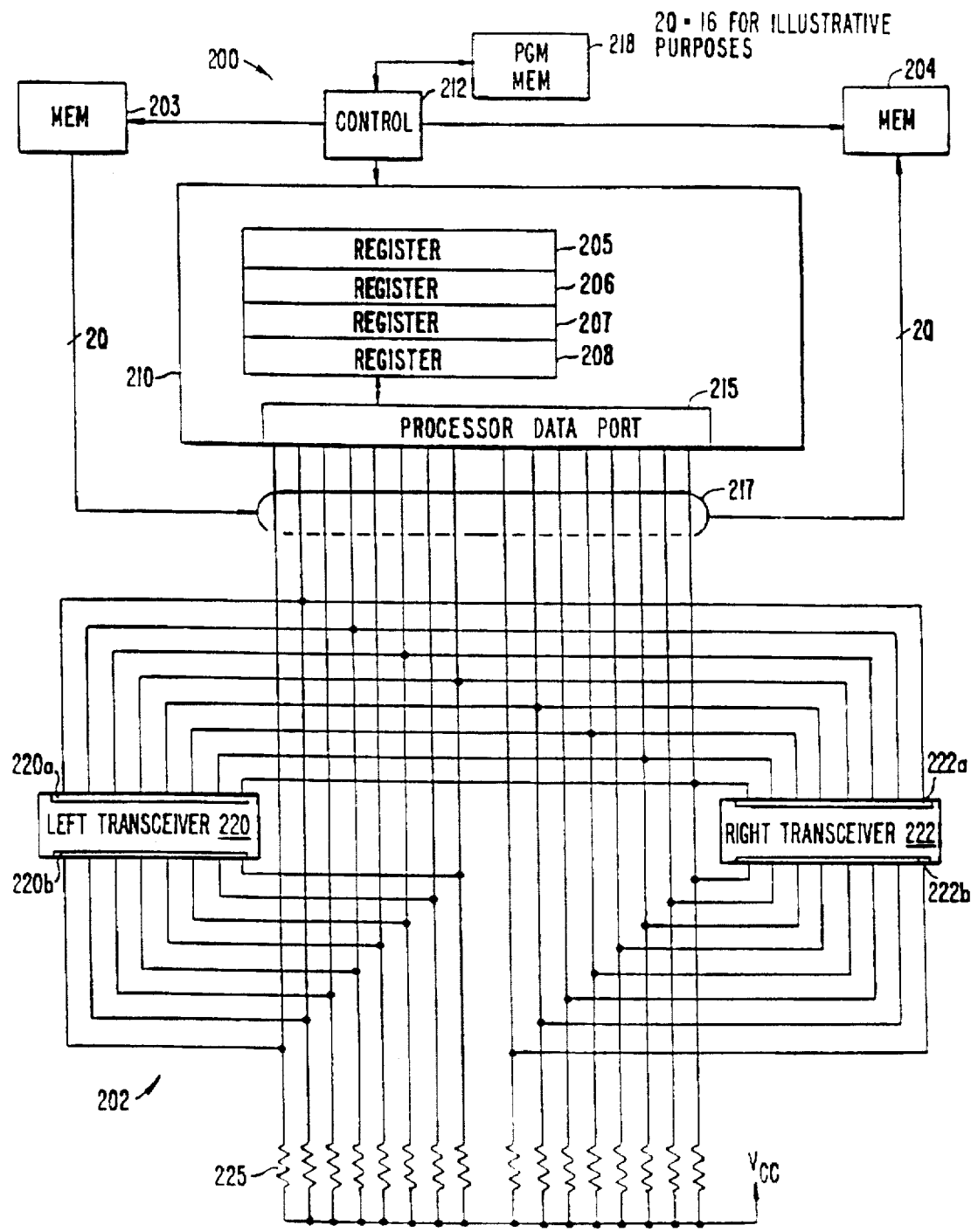
FIG._10.

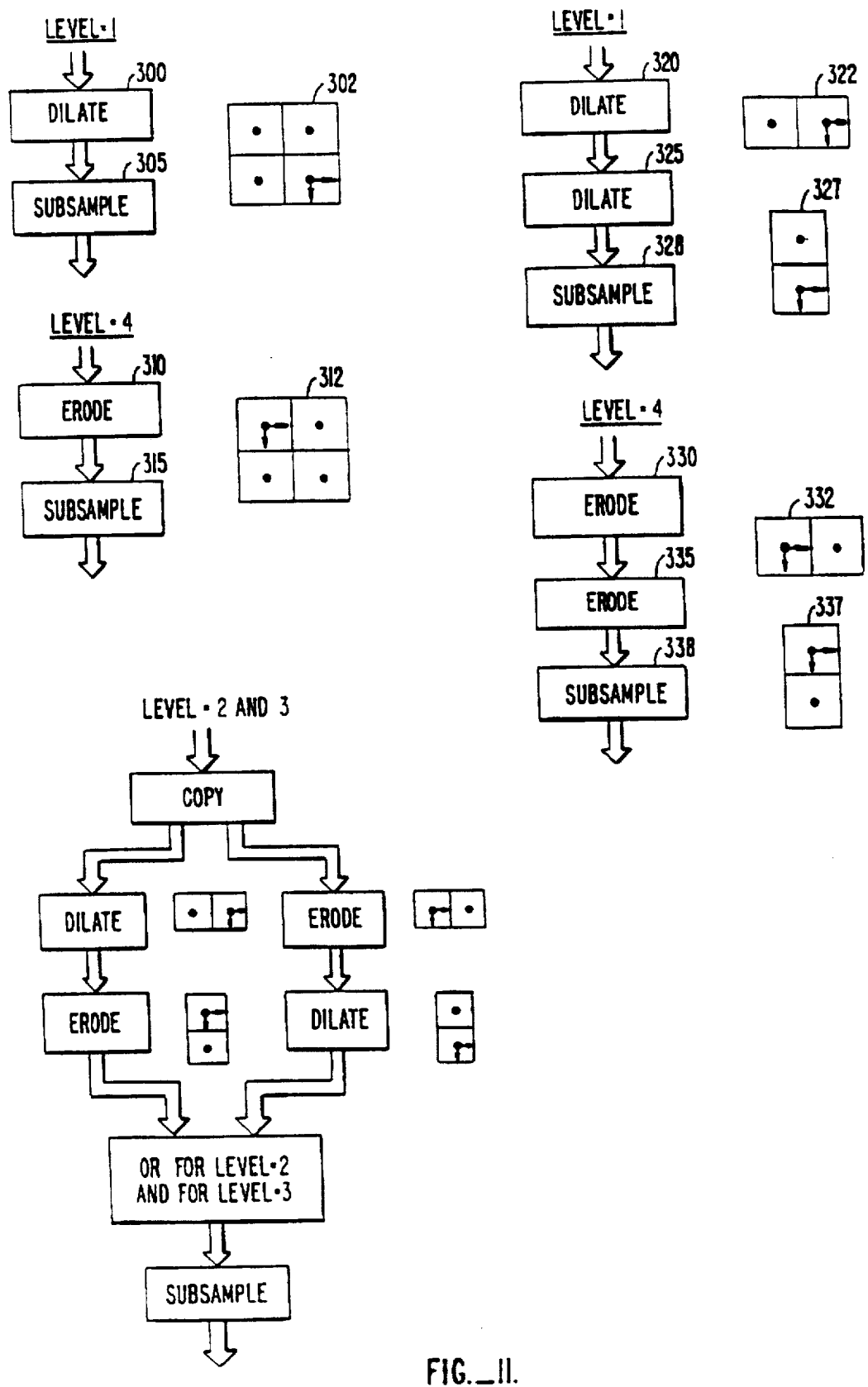
FIG._11.

IMAGE REDUCTION/ENLARGEMENT TECHNIQUE

This is a continuation of application Ser. No. 07/449,627, filed Dec. 8, 1989 now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to image processing and more specifically to techniques for rapidly reducing or enlarging image bit maps.

At the resolutions used by modern electronic printers and scanners, the number of pixels in an image can be quite large. At 600 dots per inch, a single 8.5 inch by 11 inch image contains 33,000,000 pixels. Processing such large amounts of data is expensive and time consuming. Fortunately, many image interpretation operations need not be done at full resolution, but may be done on images that have been uniformly reduced in size. Operations on reduced images can provide significant performance improvements. In general, it is not necessary to reduce images by arbitrary factors. Rather, reductions by simple powers of 2 will generally suffice.

U.S. Pat. No. 4,742,553 to Irwin discloses the possible use of thresholded reductions in the context of accomplishing resolution conversion. The example given is a 2×2 reduction wherein each tile of 4 input pixels is mapped onto a single output; pixel. The particular example had the output pixel value being OFF for 0–2 input pixels ON and the output pixel being ON for 3–4 input pixels being ON. It is noted that the technique inevitably results in the loss of gray scale information. There are, however, applications where the loss of gray scale information is not significant.

SUMMARY OF THE INVENTION

The present invention is drawn to techniques for efficiently reducing image bitmaps.

In brief, a method of reducing an M X N input binary image (M rows of N pixels each) by a factor of m vertically and n horizontally includes the steps of performing at least one logical operation between bits in consecutive groups of m adjacent rows to provide a resultant single row for each group of m rows, and performing at least one logical operation between bits in consecutive groups of n adjacent columns to provide a resultant single column for each group of n columns. For certain types of reductions, the resulting reduced image will be the desired output image, while for other types, the resultant image will be one of a required plurality of intermediate images, which are then combined to provide the desired output image.

Consider the examples of a 2×2 reduction wherein each 2×2 tile of input pixels is mapped onto a single pixel in the output image, with the value of the pixel in the output image being determined by whether the number of ON pixels in the tile in the input image is greater than or equal to a threshold level. A reduction with LEVEL=1 (1 or more pixels ON) is produced by ORing pairs of adjacent rows to provide a reduced number of rows and then ORing pairs of adjacent columns to provide the desired reduced image. Similarly, a reduction with LEVEL=4 is produced by ANDing pairs of adjacent rows and then ANDing pairs of adjacent columns to provide the desired reduced image. However, a reduction with LEVEL=2 or LEVEL=3 requires producing a pair of intermediate images which are then combined. One intermediate image is produced by ORing pairs of adjacent rows and then ANDing pairs of adjacent columns; the other intermediate image is produced by ANDing pairs of adjacent rows and ORing pairs of adjacent columns. The reduced image with LEVEL=2 is produced by ORing the intermediate images; the reduced image with LEVEL=3 is produced by ANDing the intermediate images.

Word parallelism in the computer makes logical operations between rows computationally efficient. A row of pixels is represented by a number of adjacent words in memory, and therefore logically combining a pair of rows, bit by bit, may be accomplished by combining the words that make up one row with the words that make up the other row. This is computationally efficient since a single operation that combines two words logically combines many pairs of bits at a time.

By way of contrast, a column of pixels is represented by one bit from each of many words in memory. Therefore, logically combining two columns requires combining pairs of bits in each word, one pair at a time, without the benefit of word parallelism. Therefore, the column operations are much less efficient computationally since the corresponding bits in the two columns must be found, two bits at a time, before the logical operations can be done.

Column operations can be sped up by use of lookup tables. If each row is considered a logically contiguous pixelword, a reduction by a factor n requires a lookup table for each logical operation. The pixelword is broken up into segments n*k pixels wide. The table contains $2^{n*k}$ entries, addressable by an (n*k)-bit address. The entry for that address is k bits wide, with each bit being equal to the result of performing the desired logical operation on n-bit groups of the (n*k)-bit address.

Performing row and column operations in a general purpose computer, even with lookup tables for column operations, is limited by the width of the computer word. A further aspect of the invention overcomes this limitation by providing a technique and specialized hardware for performing column operations on very wide pixelwords. Assume a wide pixelword has 2Q bits, with bits being numbered 0 to (2Q–1). A pixelword is reduced in two stages.

Apparatus at the first stage provides the facility to combine the wide pixelword with a shifted version of itself. To this end, the pixelword is read into a pair of registers, shifted one position (say to the right) in one register, and the contents of the two registers are logically combined. The result is a pixelword having the desired pairwise combinations in every other bit position, which in the case of a right shift are the odd bit positions 1, 3, . . . , (2Q–1). The even bit positions contain invalid data. The result transferred to a processor data port and made available on a data bus.

Apparatus at the second stage provides the facility for compressing the separated bits. It includes first and second latched transceivers, each having two ports. The lines from each of the first ports are connected to the odd data bus lines. The lines of the second port of the first transceiver are connected to adjacent lines on one half of the data bus while the lines from the second port of the second transceiver are coupled to adjacent lines on the other half of the data bus.

Thus, pixelwords are compressed as follows. A first input pixelword is processed at the first stage so that the bits of interest (valid bits) occupy the odd bit positions, and the result is put on the data bus. The odd bits of the bus are latched into the first transceiver via its first port. A second input pixelword is similarly processed and the odd bits are latched into the second transceiver via its first port. The contents of the two transceivers are read out through their second ports onto respective halves of the data bus and are communicated to the processor data port. This represents a new pixelword that is the column reduced version of the two input pixelwords. It is written back into memory in a location set aside for the reduced image.

A further understanding off the nature and advantages of the present invention may be realized by reference to the remaining portions of the specification and the accompanying drawings.

BRIEF DESCRIPTION OF THE DRAWINGS

FIG. 1 is a block diagram of an image scanning and processing system incorporating the present invention;

FIGS. 2A and 2B are schematic views showing the reduction of an image by successive row and column operations;

FIG. 2C shows flow diagrams for implementing thresholded 2×2 reductions;

FIG. 3A shows 2×2 arrays that return an ON pixel when acted on by 2×2 basis operators;

FIG. 3B shows the set of 2×2 arrays in canonical form;

FIG. 4 is a schematic view of a table lookup system for performing column operations;

FIGS. 5A and 5B show the set of 3×3 arrays in canonical form, with the threshold operators for a 3×3 reduction;

FIGS. 6A–6H show the set of 4×4 arrays in canonical form;

FIGS. 7 and 8 are schematic representations of 4×1 thresholding operators applied to particular column vectors;

FIG. 9 is a schematic view of a table lookup system for performing expansions;

FIG. 10 is a logic schematic of hardware for use in performing column operations; and FIG. 11 shows flow diagrams for morphological implementations of thresholded reductions.

DESCRIPTION OF SPECIFIC EMBODIMENTS
Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including non-alphabetic linguistic characters.

"Line graphics"0 refers to portions of a document or image composed of graphs, figures, or drawings other than text, generally composed of horizontal, vertical, and skewed lines having substantial run length as compared to text. Graphics could range from horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g. upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care", are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

System Overview

FIG. 1 is a block diagram of an image analysis system 1 within which the present invention may be embodied. The basic operation of system 1 is to extract or eliminate certain characteristic portions of a document 2. To this end, the system includes a scanner 3 which digitizes the document on a pixel basis, and provides a resultant data structure, typically referred to as an image. Depending on the application, the scanner may provide a binary image (a single bit per pixel) or a gray scale image (a plurality of bits per pixel). The image contains the raw content of the document, to the precision of the resolution of the scanner. The image may be sent to a memory 4 or stored as a file in a file storage unit 5, which may be a disk or other mass storage device.

A processor 6 controls the data flow and performs the image processing. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer or display, or may be written back to file storage unit 5.

Basic Procedure

Consider an m×n reduction (reduction by a factor of m vertically and n horizontally) of an M×N original image (M rows, N columns). Since most of the following discussion deals with binary images (one bit per pixel), pixels will often be referred to as bits.

The reduction occurs in a sequence of two steps. In the first step, raster operations (either AND or OR) are performed on each set of m rows, with the result going into a single row in a temporary array. This is illustrated in FIG. 2A for m=2. In this way, the number of rows is reduced by a factor of m. If M/m is not an integer, the excess (=M mod m) rows will be ignored. In the second step, raster operations map each set of n columns in the temporary array into a single column in the reduced array, as illustrated in FIG. 2B for n=2. In this reduction, any excess (=N mod n) columns will be ignored.

This procedure reduces the problem from a transformation on the full image to the logical problem of reducing an m×n rectangular array of bits (called a tile) to one bit. We wish to find a sequence of AND and OR operations between the rows and columns that will result in a thresholding operation on each m×n tile in the original.

For the purpose of illustration consider equal reduction factors in both dimensions, i.e., m=n. Specifically, we want a set of $n^2$ boolean operators, implementable by row and column raster operations, that map an n×n bitmap to a single bit, such that for i=1, 2, . . . , $n^2$ there exists an operator with the following property: for all n×n bit arrays with fewer than i ON bits, the result is a single OFF bit, and for all arrays with i or more ON bits, the result is a single ON bit.

There is in general no unique solution to this problem, but we will develop results subject to the constraints that:

(1) we first do row operations and then column operations; and (2) the operations between rows and columns are either AND or OR.

The first constraint is in a sense arbitrary, but it allows for a more concrete description. Depending on the particular implementation, however, it may be faster if the row operations are carried out first.

For a 2×2 reduction, there are only $2^4$=16 configurations, and the minimum mapping operators are easily found by considering these 16 cases. However, the number of configurations grows exponentially with the power $n^2$: for n=3 there are $2^9$=512 configurations; for n=4 there are $2^{16}$=65,536; etc. The way to find operators that work over such large sets is to decompose them into products of particular row and column operators that will exploit symmetries among the configurations. We will choose to use row and column operators that themselves are thresholding operators for 1×n and n×1 arrays. The product of these row and column operators can then be used to form a basis set for the n×n operators, from which we select appropriate boolean combinations for thresholding.

To put the analytic discussion below in context, it is helpful to consider a brief outline of the row and column operations for performing 2×2 thresholded reductions. FIG. 2C shows flow diagrams for these operations.

A reduction with LEVEL=1 (1 or more pixels ON) is produced by ORing pairs of adjacent rows to provide a reduced number of rows and then ORing pairs of adjacent columns to provide the desired reduced image. Similarly, a reduction with LEVEL=4 is produced by ANDing pairs of adjacent rows and then ANDing pairs of adjacent columns to provide the desired reduced image. However, a reduction with LEVEL=2 or LEVEL=3 requires producing a pair of intermediate images which are then combined. One intermediate image is produced by ORing pairs of adjacent rows and then ANDing pairs of adjacent columns; the other intermediate image is produced by ANDing pairs of adjacent rows and ORing pairs of adjacent columns. The reduced image with LEVEL=2 is produced by ORing the intermediate images; the reduced image with LEVEL=3 is produced by ANDing the intermediate images.

One significant attribute of performing reductions in this way is that it is not necessary to have the entire original image or the entire intermediate images (if required) in memory. Rather, only m rows are needed. The rows, or segments thereof, are logically combined to form a single row, groups of n bits in this row are combined, and the result is stored, either permanently as a portion of the desired reduced image, or temporarily as a portion of an intermediate image. In the latter case, portions of other necessary intermediate images will be similarly generated and temporarily stored, and the portions of the intermediate images will be combined and stored as a portion of the desired reduced image.

Threshold Operators for n=2 Reduction: 2×2→1×1

As mentioned above, we choose row (and column) operators that threshold the 1×2 (and 2×1) bitmaps. Clearly, the requisite thresholding operators on either rows or columns are:

| a: | OR  | 1 or more ON bits |
| b: | AND | 2 ON bits         |

The four products of these operators form a basis set of operators on 2×2 bit arrays:

| aa: | OR/OR   | all with 1 or more ON bits  |
| ab: | OR/AND  | some with 2 or more ON bits |
| ba: | AND/OR  | some with 2 or more ON bits |
| bb: | AND/AND | all 4 ON bits               |

The comment on the right describes those 2×2 arrays for which the operator returns an ON bit. The operators aa and bb are in fact the required ones for thresholding at 1 and 4 ON bits, respectively. To find thresholding operators for 2 and 3 ON bits, we must form boolean combinations of the basis operators.

It is useful to recast the above descriptions of the array types for which the basis operators return an ON bit. Because the one-dimensional (row and column) operators are chosen to be threshold operators, these four 2×2 basis operators return an ON bit when they act on the stated subset of 2×2 arrays:

| aa: | 1 or more ON bits                  |
| ab: | at least 1 ON bit in each column   |
| ba: | at least one column with 2 ON bits |
| bb: | all 4 ON bits                      |

Now consider the 16 possible 2×2 bit arrays. Choose a subset of these arrays by applying the following two rules of reduction, which follow directly from the use of one-dimensional threshold operators:

(1) The position of ON bits within a column does not matter. Thus, put the ON bits in each column in the top rows.

(2) The columns can be permuted. Thus, arrange the columns to have the number of ON bits in each column ON bits in each column decreasing to the right.

These reduction rules generate the canonical form of an array.

FIG. 3A shows the minimum arrays (in canonical form) that will return an ON bit when operated on by the stated operator. For example, any array with one ON bit will return an ON bit when its rows are ORed and then its columns are ORed. However, the array with the single ON bit in the upper left corner is the canonical form according to the two rules above. FIG. 3B shows the set of all distinct canonical 2×2 bit arrays. (Not shown is the array of all OFF pixels).

The general procedure then is to represent the set of distinct arrays in this canonical form. The operator that projects any one of these distinct arrays is in general an intersection of basis operators, which are figuratively represented in FIG. 2. Group these canonical arrays into sets that have exactly one, two, three, . . . ON bits. The thresholding operators are then the union of operators specific to each array.

For use in later sections, we adopt the following notation for both the canonical arrays and, by implication, the operators that project them. An n×n canonical array with e(j) entries in the $j^{th}$ column is denoted $$n(e(1), \ldots, e(n))$$

Thus, the canonical arrays depicted in FIG.3 are

| 2(1,0)            | (one ON bit)    |
| 2(1,1) and 2(2,0) | (two ON bits)   |
| 2(2,1)            | (three ON bits) |
| 2(2,2)            | (four ON bits)  |

Reference to FIG. 2 for the representation of the two-dimensional basis operators makes it possible to write the 2×2 threshold operators $\Pi_1$, $\Pi_2$, $\Pi_3$, and $\Pi_4$ by inspection:

| $\Pi_1$: | aa          | all with 1 or more ON bits |
| $\Pi_2$: | ab ∪ ba     | all with 2 or more ON bits |
| $\Pi_3$: | ab ∩ ba     | all with 3 or more ON bits |
| $\Pi_4$: | bb          | all 4 ON bits              |

There are two canonical arrays for 2 ON bits, given in FIG. 3, and the union of basis operators ab and ba clearly projects all such arrays. Hence, operator $\Pi_2$ is the union of these two basis operators. There is only one canonical array for 3 ON bits, and the thresholding operator $\Pi_3$ corresponding to this array requires the intersection of the basis operators ab and ba. (This appears graphically as the union of the array representations for ab and ba given in FIG. 2.)

The threshold operators display a simple symmetry when expressed in terms of these basis operators. They could have been written down by inspection after trying a few examples, but the formal approach given above will be useful for thresholded reductions with n>2.

Implementation of 2×2→1×1 reduction

The 2×2 operators $\Pi_1$–$\Pi_4$ have been implemented in C, using the Sun rasterops functions on memory pixrects. The Sun raster operations are themselves written in C, and the column raster operations (FIG. 1B) are, in particular, very slow. Using a Sun 3/260, a 1000×1000 pixel binary image can be reduced by $\Pi_1$ and $\Pi_4$ in 2.5 seconds, and by $\Pi_2$ and $\Pi_3$ in 5 seconds. However, over 90% of this CPU time is used by the relatively small column raster operations.

A table lookup scheme can speed up column reduction operations by a factor of 25. FIG. 4 is a schematic view of a table lookup for computing pairwise bit combinations (OR and AND) for 8-bit segments of a row of pixels. This entails constructing two 28-entry tables, one for OR and one for AND, that are indexed by eight bits in the intermediate image (generated by raster operations on the rows), and contain four bits of the reduced image that correspond to the pair-wise ORing or ANDing of the index bits, respectively. The figure shows some representative pixel segments and the table entries that they point to.

As noted above, FIG. 4 shows an 8-bit index into 28-entry tables of 4-bit entries. This is for simplicity; the actual embodiment uses a 16-bit index into tables containing $2^{16}$ 8-bit entries. The OR and AND lookup tables can be generated from an iterative algorithm that does not require bit masking. For the OR table with a 16-bit index i, the 8-bit table values t(i) are generated by

```
t(0) = 0, i = 1;
for (d = 0 . . . 7)
    i₀ = 2²ᵈ;     /* start value of i */
    t₀ = 2ᵈ;      /* increment value of t */
    for (r = 1 . . . 3)
        for k = 0 . . . (i₀ − 1)
            t(i) = t(k) + t₀;
            i = i + 1;
```

Similarly, a 16-bit index AND table is generated by

```
t(0) = 0, i = 1;
for (d = 0 . . . 7)
    i₀ = 2²ᵈ;     /* start value of i */
    t₀ = 2ᵈ;      /* increment value of t */
    for (r = 1 . . . 3)
        if (r < 3) tInc = 0;
        else tInc = t₀;
        for k = 0 . . . (i₀ − 1)
            t(i) = t(k) + tInc;
            i = i + 1;
```

With this hybrid (rasterop/lookup) implementation, the column logical operations are as fast, on a per-word basis, as the Sun rasterop row operations. Thus, the column operations take one-half the time of the row operations. The total time is reduced by a factor of ten when compared to an implementation that uses only raster operations. With the hybrid implementation, the reduction operations $\Pi_1$ and $\Pi_4$ take 0.25 seconds, and $\Pi_2$ and $\Pi_3$ take 0.5 seconds on a 1000×1000 pixel binary image. Optimizing the row operations and the table lookup for columns brings these times down to 0.1 seconds and 0.2 seconds. The processing speed on a Sun 3/260 is thus $10\times10^6$ pixels/second and $5\times10^6$ pixels/second, for the fast and slow reductions, respectively.

Threshold Operators for n=3 Reduction: 3×3→1×1

The methods used for 2×2 reductions can be extended to an analogous 3×3 reduction. FIGS. 5A and 5B show the canonical 3×3 arrays and threshold operators, developed as described below.

To find the threshold operators for the $2^9$ 3×3 bit arrays, we again start with threshold operators between either rows or columns. These operators are now composed of more than one successive operation. Denote an operator $OR_{i,j}$ (or $AND_{i,j}$) to mean the OR (or AND) of i and j, where i and j are unequal elements of the set (1,2,3). Then the three threshold projection operators for rows or columns are easily seen to be

| a: | $OR_{2,1} \cup OR_{3,1}$ | (1 or more ON bits) |
|---|---|---|
| b: | $AND_{2,1} \cup AND_{3,1} \cup AND_{3,2}$ | (2 or more ON bits) |
| c: | $AND_{2,1} \cap AND_{3,1}$ | (all 3 ON bits) |

Note that the a and c operators can be reduced to two operations (from three) by sequentially operating as follows:

| a: | $OR_{2,1}\ OR_{3,1}$ |
|---|---|
| c: | $AND_{2,1}\ AND_{3,1}$ | where here the result of $OR_{i,j}$ or $AND_{i,j}$ is put in j, and the operators are evaluated from left to right.

As before, form a basis set of nine operators on the 3×3 bit arrays from products of these row and column operators. When these operators act on the 3×3 bit arrays, they give an ON bit for the stated subset of arrays:

| aa: | 1 or more ON bits |
|---|---|
| ab: | at least 1 ON bit in 2 columns |
| ac: | at least 1 ON bit in 3 columns |
| ba: | at least 2 On bits in 1 column |
| bb: | at least 2 On bits in 2 columns |
| bc: | at least 2 ON bits in 3 columns |
| ca: | at least 3 ON bits in 1 column |
| cb: | at least 3 ON bits in 2 columns |
| cc: | all 9 bits ON |

To form the threshold operators as boolean combinations of these basis operators, we form all canonical 3×3 bit arrays that are distinct in the sense of the rules discussed above. These canonical arrays are

| 3(1,0,0) | (one ON bit) |
|---|---|
| 3(1,1,0), 3(2,0,0) | (two ON bits) |
| 3(1,1,1), 3(2,1,0), 3(3,0,0) | (three ON bits) |
| 3(2,1,1), 3(2,2,0), 3(3,1,0) | (four ON bits) |
| 3(2,2,1), 3(3,1,1), 3(3,2,0) | (five ON bits) |
| 3(2,2,2), 3(3,2,1), 3(3,3,0) | (six ON bits) |
| 3(3,2,2), 3(3,3,1), 3(3,3,0) | (seven ON bits) |
| 3(3,3,2) | (eight ON bits) |
| 3(3,3,3) | (nine ON bits) |

The action of the nine basis operators given above leads to the identification associated with each canonical array, expressed in general as an intersection of basis operators. The threshold operators $III_1-III_9$ are then found as the union of these generally composite operators corresponding to the canonical arrays.

The thresholding operators display a high degree of symmetry. They can be reduced to some extent by combining terms, and some of the terms can be expressed by the 2×2 operators. For example, $$\Pi_3 ac \cup \Pi_3 \cup ca$$

Note, however, that in this expression, the a and b operators in $\Pi_3$ are the threshold operators for a 3×1 (or 1×3) bit array, not those for a 2×1 array.

Threshold Operators for n=4 Reduction: 4×4→1×1

The extension to 4×4 reduction is straightforward. FIGS. 6A–6H show the canonical 4×4 arrays and threshold operators, developed as described below.

The threshold operators that work on the $2^{16}$ 4×4 arrays are derived from products of one-dimensional 4×1 (and 1×4) threshold operators. These can be written down directly, by extension of the 3×1 operators given above. However, they are most efficiently represented by the following set of sequential operations:

| a: | $OR_{2,1}\ OR_{4,3}\ OR_{3,1}$ | (1 or more ON bits) |
|---|---|---|
| b: | $(OR_{2,1}\ OR_{4,3}\ AND_{3,1}) \cup$ $(OR_{4,1}\ OR_{3,2}\ AND_{2,1})$ | (2 or more ON bits) |
| c: | $(AND_{2,1}\ OR_{4,3}\ AND_{3,1}) \cup$ $(OR_{2,1}\ AND_{4,3}\ AND_{3,1})$ | (3 or more ON bits) |
| d: | $AND_{2,1}\ AND_{4,3}\ AND_{3,1}$ | (all 4 ON bits) |

As in the case of operators a and c for the 3×3 reductions, these operations are carried out from left to right, with the result of each part being placed in the row or column given by the second subscript.

These operators perform the same thresholding function on a 4×1 bit array as the operators $\Pi_1-\Pi_4$ perform on a 2×2 bit array. However, the representation for the former is considerably more complicated because of the one-dimensional nature of the array.

FIGS. 7 and 8 show the actions of operators b and c, respectively, on a particular bit in four adjacent rows. In FIG. 7, the operator b acts on the four bits 1100. The left side gives a 0, but the right side evaluates to 1, and because the result is an OR of these two parts, the operator b returns a 1 for this bit. In FIG. 8, the operator c acts on the four bits 1101. In this case the left side evaluates to 1 and the right side to 0, and the operator c returns a 1, the OR of the two parts.

With the row and column thresholding operators defined above, we can take products of these operators to form a basis set of 16 operators which, when applied to the set of 4×4 bit arrays, result in an ON bit for the stated subset:

| | |
|---|---|
| aa: | 1 or more ON bit |
| ab: | at least 1 ON bit in 2 columns |
| ac: | at least 1 ON bit in 3 columns |
| ad: | at least 1 ON bit in 4 columns |
| ba: | at least 2 ON bits in 1 column |
| bb: | at least 2 ON bits in 2 columns |
| bc: | at least 2 ON bits in 3 columns |
| bd: | at least 2 ON bits in 4 columns |
| ca: | at least 3 ON bits in 1 column |
| cb: | at least 3 ON bits in 2 columns |
| cc: | at least 3 ON bits in 3 columns |
| cd: | at least 3 ON bits in 4 columns |
| da: | at least 4 ON bits in 1 column |
| db: | at least 4 ON bits in 2 columns |
| dc: | at least 4 ON bits in 4 columns |
| dd: | all 16 bits ON |

The distinct canonical 4×4 bit arrays are denoted as follows:

| | |
|---|---|
| 4(1,0,0,0) | (one ON bit) |
| 4(1,1,0,0), 4(2,0,0,0) | (two ON bits) |
| 4(1,1,1,0), 4(2,1,0,0), 4(3,0,0,0) | (three ON bits) |
| 4(1,1,1,1), 4(2,1,1,0), 4(2,2,0,0), 4(3,1,0,0), 4(1,0,0,0) | (four ON bits) |
| 4(2,1,1,1), 4(2,2,1,0), 4(3,1,1,0) 4(3,2,0,0), 4(4,1,0,0) | (five ON bits) |
| 4(2,2,1,1), 4(2,2,2,0), 4(3,2,1,0) 4(3,3,0,0), 4(4,1,1,0), 4(4,2,0,0) | (seven ON bits) |
| 4(2,2,2,2), 4(3,2,2,1), 4(3,3,1,1), 4(3,3,2,0), 4(4,2,1,1), 4,(4,2,2,0), 4(4,3,1,0) 4(4,4,0,0) | (eight ON bits) |
| 4(3,2,2,2), 4(3,3,2,1), 4(3,3,3,0), 4(4,2,2,1), 4(4,3,1,1), 4(4,3,2,0), 4(4,4,1,0) | (nine ON bits) |
| 4(3,3,2,2), 4(3,3,3,1), 4(4,2,2,2), 4(4,3,2,1), 4(4,3,3,0) 4(4,4,1,1), 4(4,4,2,0) | (ten ON bits) |
| 4(3,3,3,2), 4(4,3,2,2), 4(4,3,3,1) 4(4,4,2,1), 4(4,4,3,0) | (eleven ON bits) |
| 4(3,3,3,3), 4(4,3,3,2), 4(4,4,2,2) 4(4,4,3,1), 4(4,4,4,0) | (twelve ON bits) |
| 4(4,3,3,3), 4(4,4,3,2), 4(4,4,4,1) | (thirteen ON bits) |
| 4(4,4,3,3), 4(4,4,4,2) | (fourteen ON bits) |
| 4(4,4,4,3) | (fifteen ON bits) |
| 4(4,4,4,4) | (all sixteen ON bits) |

As before, each of these canonical arrays has an associated operator that is an intersection Of the two-dimensional basis operators. The sixteen threshold operators on 4×4 arrays are then found as unions of these operators that represent the canonical arrays. The expressions can be simplified somewhat by noticing that sets of canonical arrays for lower order reducing operators are invariably contained within higher order operators. For example, that the forms if $IV_1$, $IV_2$, and $IV_3$, in terms of the basis operators a, b, and c, are identical to those $III_1$, $III_2$, and $III_3$, respectively, except that the meanings of the one-dimensional thresholding operators a, b, and c are different in the two cases.

Image Expansion Operators

Operators that expand a binary image in each direction by an integral factor can be simply constructed by a variant of the approach given above. Suppose it is desired to magnify an image by factors c and r in the horizontal and vertical directions, respectively. As before, the process requires two steps: replication of each row r times, with insertion into the expanded image, followed by similar expansion of the columns by a factor c.

Because of the inefficiency of column raster operations, fast implementations require table lookup for column expansion. FIG. 9 is a schematic view of a table lookup for expanding a row of an image to twice its length. The illustration is in terms of expanding 4-bit segments to 8 bits. More generally, if the number of columns is to be expanded by a factor of c, for example, a lookup table with $2^8$ entries of c bytes each will suffice to convert 1 byte (8 bits) of the original image into c bytes of expanded image. The following algorithm generates a table of $2^8$ 16-bit entries t(i), that map 8 bits of the original image into 16 bits, thereby doubling the width:

```
t(0) = 0, i = 1;
for (d = 0 . . . 7)
    i_0 = 2^d;       /* start value of i */
    t_0 = 3(i_0)^2;  /* increment of value of t */
    for (k = 0 . . . i_0 - 1)
        t(i) = t(k) + t_0;
        i = i + 1;
```

As before, performance of this algorithm is comparable to row raster operations, on a per-word basis.

Extension to Grayscale Images

These methods lead to a simple approach to reduction of grayscale images. Consider a simple example of a 2×2 reduction of a 4-bit or 8-bit grayscale image, that yields a reduced grayscale image with the same number of bits/pixel.

Suppose it is desired to replace the four pixel values in each 2×2 square by a single pixel with the average value, and pixel values are 8 bits. Thus, an efficient method is needed for summing the four 8-bit numbers in each 2×2 square, and dividing the result by 4. The first step is to sum corresponding (same column) pixels in even and odd numbered rows, in analogy with the row rasterops for binary images. To avoid overflow, first right-shift all pixel values: each byte in the image is right-shifted by two bits. Thus, division by 4 is done before summation. Then the pixel data in each set of even and odd rows is added. For efficiency, this can be done a word at a time, treating each set of four consecutive pixels as a 32-bit integer. (Note that each line of pixel data must be padded to word boundaries). The column sums can be carried out either directly or via table lookup. In the direct method, the even and odd adjacent bytes in a row are simply added. A somewhat more efficient implementation uses table lookup. As in the binary case, each successive 16-bits represent a pair of pixel values, and the 8-bit content of the array is the integer sum of the two bytes. The result of these row and "column" operations is a grayscale image, reduced in size by a factor of 2 in each dimension, where the value of each pixel in the reduced image is the approximate average of the four corresponding pixels in the original. These reductions are easily cascaded, giving a series of grayscale images with size reductions by powers of two.

For a 4-bit/pixel image, only the first step, the division of each pixel value by 4, need be altered. Special purpose hardware can shift each nibble within a byte, but an efficient implementation on a general purpose machine requires a table lookup. Again, one can use 16 consecutive bits (4 pixels in this case) as an index into a table. The contents of the table entry are 16 bits that represent each of the four pixel values right-shifted by two bits.

Special Hardware Configuration

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 10 is a logic schematic of specialized hardware for performing a logical operation between vertically adjacent 2Q-bit pixelwords and a pairwise bit reduction of the resulting 2Q-bit pixelword (bits 0 through 2Q- 1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way, and may be part of the same physical device.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, a 16-bit system with four registers 205, 206, 207, and 208 is shown. Among the processor's operations are those that logically combine the contents of first and second registers, and store the result in the first. The apparatus has control and logical unit 212 and a data port 215, which is coupled to a data bus 217. Control unit 212 is coupled to a program memory 218, which may be separate from memories 203 and 204, or may be part of them.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q-1) of the data bus, while port 222b is coupled to bits Q through (2Q-1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, . . . (2Q-1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

Architectural Considerations

The following is a brief discussion of some architectural issues, such as parallelism, pipelining, and stream processing, from the perspective of both speed and resource requirements for practical implementations.

First, it should be evident that the algorithms given above lend themselves to parallelism, whereby many processors can independently perform thresholded reduction on parts of the image, such as bands of a given number of scanlines. If I/O bandwidth is not a limiting factor, then processing time scales inversely with the number of processors involved.

Second, it should be noted that for n×n thresholded reduction, it is only necessary to process n lines at a time, and for expansion, only one line need be stored in a buffer. For reduction, the intermediate image (full width, 1/n times the original number of lines) need not be generated, because each line of the intermediate image is immediately converted to a reduced width line of the reduced image. Using special purpose hardware, the row and "column" operations can be pipelined: while the column operations proceed on a line, the operation on the next set of rows can execute in parallel.

Many of the thresholded reductions require generation of multiple reduced images. For example, for 2×2 reduction with either LEVEL=2 or LEVEL=3, two reduced images must be produced, and the thresholded image is derived from an AND or an OR of these two images. Again, such reduced images need not be stored. It is only necessary to produce one line of each reduced image, and then apply the appropriate logical operation to those two lines.

From the preceding observations, it follows that the image can be reduced, for whatever threshold is desired, by a streaming process that requires little intermediate storage. Sets of two or more lines of the original image are input, and single lines of the reduced image are produced. This process can be cascaded. For example, using n stages of a 2×2 reduction, after $2^n$ lines of the original image have been processed by the first stage, a single line of the $2^n$-fold reduced image is output from the $n^{th}$ stage. Because of the independence of the stages in the cascade, a different threshold could be chosen for each stage.

FIG. 11 shows flowcharts illustrating an alternative way of implementing thresholded reductions. A 2×2→1 thresholded reduction with LEVEL=1 may be implemented by dilating (step 300) with a 2×2 SE 302, followed by subsampling (step 305), taking only the upper left pixel in each 2×2 tile of the resulting image. Likewise, the 2×2 →1 thresholded reduction with LEVEL=4 can be implemented by eroding (step 310) with a 2×2 SE 312, followed by subsampling (step 315), taking only the upper left pixel in each 2×2 tile of the image. SE 302 is a 2×2 solid SE having its center position in the lower right corner; SE 312 is a 2×2 solid SE having its center position in the upper left corner.

Another way to perform the LEVEL=1 reduction is by dilating (step 320) with a 1×2 horizontal SE 322, dilating (step 325) with a 2×1 vertical SE 327, and then subsampling (step 328), taking only the upper left pixel in each 2×2 tile of the image. Likewise, a LEVEL=4 reduction can be performed by eroding (step 330) with a 1×2 horizontal SE 332, eroding with a 2×1 vertical SE 337, and then subsampling (step 338), taking only the upper left pixel in each 2×2 tile.

The horizontal and vertical SE's for the LEVEL=1 reduction have their center positions in the right and bottom positions while those for the LEVEL=4 reduction have their center positions in the left and upper pixel locations. These distinctions are only necessary because of the specific definitions of dilation and erosion, which are taken from R. M. Haralick, S. R. Sternberg, and X. Zhuang "Image Analysis Using Mathematical Morphology", IEEE Transactions on Pattern Analysis and Machine Intelligence, Volume PAMI-9, pages 532–550, July, 1987.

The 2×2→1 reduction with threshold LEVEL=2 is a bit more complicated because it requires both dilations (OR's) and erosions (AND's). It is performed by making a first intermediate image by dilating with SE 322 and eroding with SE 337; making a second intermediate image by eroding with SE 332 and then dilating with SE 327; making a third intermediate image by ORing the first and second intermediate images; and subsampling the third intermediate image taking only the upper left pixel in each 2×2 tiling of the image. Similarly, the 2×2 reduction with threshold LEVEL=3 is obtained in the same manners for LEVEL=2 except that in the third step, the first and second intermediate images are ANDed.

Implementation on a general purpose computer is efficient, because it involves only a sequence of full image logical raster operations, followed by a single subsampling operation.

The full image raster operations are efficiently implemented in hardware or software, and the subsampling operation can be performed by a fast table lookup on, for example, 16 image bits at a time.

For the subsampling step for 2×2=>1 reduction, only every other row needs to be subsampled (i.e., row(0), row (2), etc.). The bits in each sampled row can be taken, for example, 16 at a time, and each such 16 bit word can be used as an index into a $2^{16-}$ entry table, whose contents are the 8 bits consisting bits 0, 2, . . . 14 the 16-bit word.

For the subsampling table for 2×2=>1 reduction with a 16-bit index, the 8-bit table values t(i) are generated by:

```
t(0) = 0; i = 1;
for (d = 0, . . . , 7)
    i0 = 2**2d;    /* start value of i */
    t0 = 2**d;     /* increment value of t */
    for (r = 1, . . . , 3)
        if (r < 2) tInc = 0;
        else tInc = t0;
        for (k = 0, . . . , i0 – 1)
            t(i) = t(k) + tInc;
            i = i + 1;
```

In a similar manner, the general thresholded reductions (m×n) can be constructed by the following sequence:

(1) morphological operations on the original image, producing a set of intermediate images, (2) logical operations carried out on the intermediate images, producing a final full-size image, and (3) an m×n subsampling of the final full sized image to produce the reduced image.

For the general case, the SE's used in the morphological operations are of dimension (m×1) and (1×n).

The (m×n) subsampling is performed by taking every n-th bit (bit(0), bit(n, . .) on every m-th row (rows 0, m, 2m, . . .). The most efficient implementation in software is by table lookup.

Discussion of the Software

A current embodiment of the invention is implemented in software on a digital computer. Appendix 1 (©1988, Unpublished Work, Xerox Corporation) provides a source code program for implementation of this embodiment. The program is in the "C" language, well known to those of skill in the art. The program has been demonstrated on a Sun Workstation, although it will be apparent to those of skill in the art that a wide variety of programming languages and hardware configurations could readily be used based on this disclosure without departing from the scope of the invention.

Conclusion

In conclusion it can be seen that the present invention provides efficient techniques, with software and hardware implementations, for performing thresholded reductions.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A method of reducing a binary input image to a binary reduced image, via one or more intermediate images, each intermediate image being of the same size as the reduced image and being produced by operating on the input image, wherein the input image includes non-overlapping subregions, each subregion having m rows of n pixels, each subregion corresponding to a respective pixel in the reduced image, the pixel in the reduced image corresponding to a given subregion in the input image being ON if and only if the number of ON pixels in the given subregion is no less than a designated threshold value, the threshold value being greater than 1 and less than mn, the method comprising the steps of:

performing a set of logical operations between the rows of the input image or one of the intermediate images, designated row operations; and performing a set of logical operations between the columns of the input image or one of the intermediate images, designated column operations;

wherein at least one of the column and row operations is a logical AND and at least one of the column and row operations is a logical OR;

the sets of column and row operations depending on the values of m, n, and the threshold value, and resulting in the reduced image.

2. The method of claim 1 wherein said step of performing column operations includes the use of a lookup table.

3. A method of reducing a binary input image to a binary reduced image, via one or more intermediate images, each intermediate image being of the same size as the reduced image and being produced by operating on the input image, wherein the input binary image includes non-overlapping subregions, each subregion having m rows of n pixels, each subregion corresponding to a respective pixel in the reduced image, the pixel in the reduced image corresponding to a given subregion in the input image being ON if and only if the number of ON pixels in the given subregion is no less than a designated threshold value, the threshold value being greater than 1 and less than mn, the method comprising the steps of:

performing a set of operations between the rows of the input image or one of the intermediate images, designated row operations; and performing a set of operations between the columns of the input image or one of the intermediate images, designated column operations;

wherein at least one of the column and row operations is a logical AND and at least one of the column and row operations is a logical OR; and wherein said step of performing column operations includes the step of performing a particular column operation on a particular image, the particular image being the input image or one of the intermediate images, the step of performing the particular column operation on the particular image including the substeps of copying a part of a row of the particular image, shifting the copy of the part of the row of the particular image, logically combining the part of the row and the copy of the part of the row, so shifted, and extracting a subset of the bits representing a part of the image resulting from performing the particular operation on the particular image and corresponding to the part of the row of the particular image;

the sets of column and row operations depending on the values of m, n, and the threshold value, and resulting in the reduced image.

4. The method of claim 3 wherein said substeps are performed in special-purpose hardware.

5. A method of reducing a binary input image to a binary reduced image wherein the input image includes non-overlapping subregions, each subregion having m rows of n pixels, each subregion corresponding to a respective pixel in the reduced image, the pixel in the reduced image corresponding to a given subregion in the input image being ON if and only if the number of ON pixels in the given subregion is no less than a designated threshold value, the threshold value being greater than 1 and less than mn, the method comprising the steps of:

producing a plurality of intermediate images, each intermediate image being of the same size as the reduced image and being produced by operating on the input image, the step of producing a particular one of the intermediate images including the substeps of performing a set of operations consisting solely of logical operations between all the rows in consecutive groups of m adjacent rows in the input image to produce a smaller image having a number of rows reduced by a factor of m, and performing a set of operations consisting solely of logical operations between all the columns in consecutive groups of n adjacent columns in the smaller image to produce the intermediate image having a number of columns reduced by a factor of n; and performing at least one logical operation between the intermediate images to obtain the reduced image;

the sets of operations between rows, the sets of operations between columns, and the at least one logical operation between the intermediate images depending on the values of m, n, and the threshold value, and resulting in the reduced image.

6. The method of claim 5 wherein said step of performing column operations includes the use of a lookup table.

7. The method of claim 5, wherein:

m is equal to 4;

n is equal to 4;

the threshold value is equal to 11;

said step of performing a set of logical operations between all the rows in each consecutive group of m adjacent rows in the input image comprises:

(a) ORing the first row of the group with the second row of the group;

(b) Oring the third row of the group with the fourth row of the group;

(c) ANDing the result of step (a) with the result of step (b);

(d) ORing the first row of the group with the fourth row of the group;

(e) ORing the second row of the group with the third row of the group;

(f) ANDing the result of step (d) with the result of step (e); and (g) ORing the result of step (c) with the result of step (f) to obtain a row in the smaller image corresponding to the group of four rows in the input image; and said step of performing a set of logical operations between all the columns in each consecutive group of n adjacent columns in the smaller image comprises:

(h) ANDing the first column of the group with the second column of the group;

(i) ORing the third column of the group with the fourth column of the group;

(j) ANDing the result of step (h) with the result of step (i);

(k) ORing the first column of the group with the second column of the group;

(l) ANDing the third column of the group with the fourth column of the group;

(m) ANDing the result of step (k) with the result of step (l); and (n) ORing the result of step (j) with the result of step (m) to obtain a column in the particular intermediate image corresponding to the group of four columns in the smaller image.

8. The method of claim 5, wherein the substep of performing a set of operations consisting solely of logical operations between all the rows is performed prior to the substep of performing a set of operations consisting solely of logical operations between all the columns.

9. The method of claim 5, wherein the substep of performing a set of operations consisting solely of logical operations between all the rows is intermingled with the substep of performing a set of operations consisting solely of logical operations between all the columns.

10. A method of reducing a binary input image to a binary reduced image wherein the input image includes non-overlapping subregions, each subregion having m rows of n pixels, each subregion corresponding to a respective pixel in the reduced image, the pixel in the reduced image corresponding to a given subregion in the input image being ON if and only if the number of ON pixels in the given subregions is no less than a designated threshold value, the threshold value being greater than 1 and less than mn, the method comprising the steps of:

producing a plurality of intermediate images, each intermediate image being the same size as the reduced image, the step of producing a particular one of the plurality of intermediate images including the substeps of performing a set of logical operations between the rows of the input image to obtain a smaller image, each row of the smaller image corresponding to a respective group of m adjacent rows in the input image, and performing a set of logical operations between the columns of the smaller image to obtain the particular intermediate image, each column in the particular intermediate image corresponding to a respective group of n adjacent columns in the smaller image; and performing at least one logical operation between the intermediate images to obtain the reduced image;

the sets of operations between rows, the sets of operations between columns, and the at least one logical operation between the intermediate images depending on the values of m, n, and the threshold value, and resulting in the reduced image;

wherein said step of performing a set of logical operations between the columns of the smaller image to obtain the particular intermediate image includes the substeps of copying a part of a row of the smaller image, shifting the copy of the part of the row of the smaller image, logically combining the part of the row and the copy of the part of the row, so shifted, and extracting a subset of the bits representing a part of the particular intermediate image corresponding to the part of the row of the smaller image.

11. The method of claim 10 wherein said substeps are performed in special-purpose hardware.

12. A method of performing a 2×2 reduction with a threshold of 2 on a binary input image to produce a reduced image, the method comprising the steps of:

logically ORing pairs of adjacent rows in the input image to provide a first intermediate image having a reduced number of rows;

logically ANDing pairs of adjacent columns in the first intermediate image to provide a second intermediate image having a reduced number of rows and columns;

logically ANDing pairs of adjacent rows in the input image to provide a third intermediate image having a reduced number of rows;

logically ORing pairs of adjacent columns in the third intermediate image to provide a fourth intermediate image having a reduced number of rows and columns; and logically ORing the second and fourth intermediate images to provide the reduced image.

13. The method of claim 12 wherein each of said steps of ANDING and ORING adjacent columns includes the use of a lookup.

14. The method of claim 12 wherein said step of logically ANDING pairs of adjacent columns in the first intermediate image includes the substeps of:

copying part of a row of the first intermediate image;

shifting the copy of the part of the row;

logically ANDing the part of the row and the copy of the part of the row, so shifted; and extracting a subset of the bits representing a part of the second intermediate image corresponding to the part of the row of the first intermediate image.

15. The method of claim 14 wherein said substeps are performed in special-purpose hardware.

16. The method of claim 12 wherein said step of logically ORing pairs of adjacent columns in the third intermediate image includes the substeps of:

copying a part of a row of the third intermediate image;

shifting the copy of the part of the row;

logically ORing the part of the row and the copy of the part of the row, so shifted; and extracting a subset of the bits representing a part of the fourth intermediate image corresponding to the part of the row of the third intermediate image.

17. The method of claim 16 wherein said substeps are performed in special-purpose hardware.

18. The method of claim 12 wherein said step of logically ORing pairs of adjacent columns in the in the third intermediate image includes the substeps of:

copying a part of a row of the third intermediate image;

shifting the copy of the part of the row;

logically ORing the part of the row and the copy of the part of the row, so shifted; and extracting a subset of the bits representing a part of the fourth intermediate image corresponding to the part of the row of the third intermediate image.

19. The method of claim 18 wherein said substeps are performed in special-purpose hardware.

20. A method of performing a 2×2 reduction with a threshold of 3 on a binary input image to produce a reduced image, the method comprising the steps of:

logically ORing pairs of adjacent rows in the input image to provide a first intermediate image having a reduced number of rows;

logically ANDing pairs of adjacent columns in the first intermediate image to provide a second intermediate image having a reduced number of rows and columns;

logically ANDing pairs of adjacent rows in the input image to provide a third intermediate image having a reduced number of rows;

logically ORing pairs of adjacent columns in the third intermediate image to provide a fourth intermediate image having a reduced number of rows and columns; and logically ANDing the second and fourth intermediate images to provide the reduced image.

21. The method of claim 20 wherein each of said steps of ANDING and ORING columns includes the use of a lookup table.

22. The method of claim 21 wherein said step of logically ANDING pairs of adjacent columns in the first intermediate image includes the substeps of:

copying a part of a row of the first intermediate image;

shifting the copy of the part of the row;

logically ANDing the part of the row and the copy of the part of the row, so shifted; and extracting a subset of the bits representing a part of the second intermediate image corresponding to the part of the row of the first intermediate image.

23. The method of claim 22 wherein said substeps are performed in special-purpose hardware.

24. A method of performing an m-by-n thresholded reduction on a binary input image to obtain a binary reduced image, the thresholded reduction being characterized by a threshold value that is greater than 1 and less than mn, the method comprising the steps of:

producing a plurality of intermediate images, each intermediate image being the same size as the input image and including one or more non-overlapping m-by-n rectangular arrays of pixels;

a particular one of the plurality of intermediate images being produced by subjecting the input image to a corresponding particular one of a plurality of sequences of morphological operations, each morphological operation in the particular one of the plurality of sequences being performed with a solid structuring element (SE);

performing at least one logical operation among the intermediate images to produce a final intermediate image; and subsampling the final intermediate image by selecting the pixel located in a predetermined position of each m-by-n array of pixels, thereby producing the reduced image;

the plurality of sequences of morphological operations, and the at least one logical operation among the intermediate images depending on the values of m, n, and the threshold value, and resulting in the reduced image.

25. A method of performing a 2×2 reduction with a threshold of 1 on a binary input image to obtain a binary reduced image, the method comprising the steps of:

subjecting the input image to a dilation operation with a respective solid 1×2 horizontal structuring element (SE) having its center at a respective predetermined position to produce a resultant image;

subjecting the resultant image to a dilation operation with a solid 2×1 vertical SE having its center at a respective predetermined position to produce an intermediate image, wherein the intermediate image comprises one or more non-overlapping 2×2 rectangular arrays of pixels; and subsampling the intermediate image by selecting the pixel located in a predetermined position of each array of pixels, thereby producing the reduced image.

26. The method of claim 15 wherein:

the solid 1×2 SE has its center at the right; and the solid 2×1 SE has its center at the bottom; and the predetermined position of each 2×2 array of pixels is the upper left.

27. A method of performing a 2×2 reduction with a threshold of 4 on a binary input image to obtain a binary reduced image, the method comprising the steps of:

subjecting the input image to an erosion operation with a respective solid 1×2 horizontal structuring element (SE) having its center at a respective predetermined position to produce a resultant image;

subjecting the resultant image to an erosion operation with a solid 2×1 vertical SE having its center at a respective predetermined position to produce an intermediate image, wherein the intermediate image comprises one or more non-overlapping 2×2 rectangular arrays of pixels; and subsampling the intermediate image by selecting the pixel located in a predetermined position of each array of pixels, thereby producing the reduced image.

28. The method of claim 27 wherein:

the solid 1×2 SE has its center at the left; and the solid 2×1 SE has its center at the top; and the predetermined position of each 2×2 array of pixels is the upper left.

29. A method of performing a 2×2 reduction with a threshold of 2 on a binary input image to obtain a binary reduced image, the method comprising the steps of:

dilating the input image with a first solid 1×2 horizontal structuring element (SE) to provide a first intermediate image;

eroding the first intermediate image with a first solid 2×1 vertical SE to produce a second intermediate image;

eroding the input image with a second solid 1×2 horizontal SE to produce a third intermediate image;

dilating the third intermediate image with a second solid 2×1 vertical SE to produce a fourth intermediate image; and logically ORing the second and fourth intermediate images to provide a fifth intermediate image, wherein the fifth intermediate image comprises one or more non-overlapping 2×2 rectangular arrays of pixels;

subsampling the fifth intermediate image by selecting the pixel located in a predetermined position of each array of pixels, thereby producing the reduced image.

30. The method of claim 29 wherein:

the first solid 1×2 horizontal SE has its center at the right;

the first solid 2×1 vertical SE has its center at the top;

the second solid 2×1 vertical SE has its center at the left;

the second solid 1×2 horizontal SE has its center at the bottom; and the predetermined position of each 2×2 array of pixels is the upper left.

31. A method of performing a 2×2 reduction with a threshold of 3 on a binary input image to obtain a binary reduced image, the method comprising the steps of:

dilating the input image with a first solid 1×2 horizontal structuring element (SE) to provide a first intermediate image; eroding the first intermediate image with a first solid 2×1 vertical SE to produce a second intermediate image;

eroding the input image with a second solid 1×2 horizontal SE to produce a third intermediate image;

dilating the third intermediate image with a second solid 2×1 vertical SE to produce a fourth intermediate image; and logically ANDing the second and fourth intermediate images to provide a fifth intermediate image, wherein the fifth intermediate image comprises one or more non-overlapping 2×2 rectangular arrays of pixels;

subsampling the fifth intermediate image by selecting the pixel located in a predetermined position of each array of pixels, thereby producing the reduced image.

32. The method of claim 31 wherein:

the first solid 1×2 horizontal SE has its center at the right;

the first solid 2×1 vertical SE has its center at the top;

the second solid 2×1 vertical SE has its center at the left;

the second solid 1×2 horizontal SE has its center at the bottom; and the predetermined position of each array of pixels is the upper left.

33. A method of performing a 2×2 reduction with a threshold of 2 on a binary input image to produce a reduced image, the method comprising the steps of:

logically ANDing pairs of adjacent columns in the input image to provide a first intermediate image having a reduced number of rows and columns;

logically ORing pairs of adjacent rows in the first intermediate image to provide a second intermediate image having a reduced number of rows;

logically ORing pairs of adjacent columns in the input image to provide a third intermediate image having a reduced number of rows and columns;

logically ANDing pairs of adjacent rows in the third intermediate image to provide a fourth intermediate image having a reduced number of rows; and logically ORing the second and fourth intermediate images to provide the reduced image with a threshold of 2.

34. The method of claim 33 wherein each of said steps of ANDING and ORING adjacent columns includes the use of a lookup table.

35. The method of claim 33 wherein said step of logically ANDING pairs of adjacent columns in the input image includes the substeps of:

copying a part of a row of the input image;

shifting the copy of the part of the row;

logically ANDing the part of the row and the copy of the part of the row, so shifted; and extracting a subset of the bits representing a part of the first intermediate image corresponding to the part of the row of the input image.

36. The method of claim 35 wherein said substeps are performed in special-purpose hardware.

37. A method of performing a 2×2 reduction with a threshold of 3 on a binary input image to produce a reduced image, the method comprising the steps of:

logically ANDing pairs of adjacent columns in the input image to provide a first intermediate image having a reduced number of rows and columns;

logically ORing pairs of adjacent rows in the first intermediate image to provide a second intermediate image having a reduced number of rows;

logically ORing pairs of adjacent columns in the input image to provide a third intermediate image having a reduced number of rows and columns;

logically ANDing pairs of adjacent rows in the third intermediate image to provide a fourth intermediate image having a reduced number of rows; and logically ANDing the second and fourth intermediate images to provide the reduced image with a threshold of 3.

38. The method of claim 37 wherein each of said steps of ANDING and ORING columns includes the use of a lookup table.

39. The method of claim 37 wherein said step of logically ANDING pairs of adjacent columns in the input image includes the substeps of:

copying a part of a row of the input image;

shifting the copy of the part of the row;

logically ANDing the part of the row and the copy of the part of the row, so shifted; and extracting a subset of the bits representing a part of the first intermediate image corresponding to the part of the row of the input image.

40. The method of claim 39 wherein said substeps are performed in special-purpose hardware.

41. A method of reducing a binary input image to a reduced image wherein the input image includes non-overlapping subregions, each subregion having m rows of n pixels, each subregion corresponding to a respective pixel in the reduced image, the pixel in the reduced image corresponding to a given subregion in the input image being ON if and only if the number of ON pixels in the given subregion is no less than a designated threshold value, the threshold value being greater than 1 and less than mn, the method comprising the steps of:

producing a plurality of intermediate images, each intermediate image being of the same size as the reduced image and being produced by operating on the input image, the step of producing a particular one of the intermediate images including the substeps of performing a set of operations consisting solely of logical operations between all the columns in consecutive groups of n adjacent columns in the input image to produce a smaller image having a number of columns reduced by a factor of n, and performing a set of operations consisting solely of logical operations between all the rows in consecutive groups of m adjacent rows in the smaller image to produce the intermediate image having a number of rows reduced by a factor of m; and performing at least one logical operation between the intermediate images to obtain the reduced image.

42. The method of claim 41 wherein said step of performing column operations includes the use of a lookup table.

43. A method of performing an m-by-n thresholded reduction on a binary input image to obtain a binary reduced image, the method comprising the steps of:

subjecting the input image to a plurality of sequences of morphological operations, each morphological operation with a respective solid structuring element (SE), to produce a corresponding plurality of intermediate images, wherein each intermediate image comprises one or more non-overlapping m-by-n rectangular arrays of pixels;

performing at least one logical operation among the intermediate images to produce a final intermediate image; and subsampling the final intermediate image by selecting the pixel located in a predetermined position of each array of pixels, thereby producing the reduced image, wherein one of the sequences comprises:

dilating the input image with a solid horizontal SE having its center at a respective predetermined position to produce a resultant image; and eroding the resultant image with a solid vertical SE having its center at a respective predetermined position to produce the intermediate image.

44. A method of performing an m-by-n thresholded reduction on a binary input image to obtain a binary reduced image, the method comprising the steps of:

subjecting the input image to a plurality of sequences of morphological operations, each morphological operation with a respective solid structuring element (SE), to produce a corresponding plurality of intermediate images, wherein each intermediate image comprises one or more non-overlapping m-by-n rectangular arrays of pixels;

performing at least one logical operation among the intermediate images to produce a final intermediate image; and subsampling the final intermediate image by selecting the pixel located in a predetermined position of each array of pixels, thereby producing the reduced image, wherein one of the sequences comprises:

eroding the input image with a solid horizontal SE having its center at a respective predetermined position to produce a resultant image; and dilating the resultant image with a solid vertical SE having its center at a respective predetermined position to produce the intermediate image.

\* \* \* \* \*